(12) United States Patent
Sealey et al.

(10) Patent No.: US 11,364,093 B2
(45) Date of Patent: Jun. 21, 2022

(54) DENTAL STENT

(71) Applicant: Smile Fast Ltd, Penrith (GB)

(72) Inventors: Thomas Sealey, Penrith (GB); Olumide Ojo, Penrith (GB)

(73) Assignee: SMILE FAST LTD, Penrith (GB)

( * ) Notice: Subject to any disclaimer, the term of this patent is extended or adjusted under 35 U.S.C. 154(b) by 0 days.

(21) Appl. No.: 17/299,042

(22) PCT Filed: May 4, 2020

(86) PCT No.: PCT/GB2020/051096
§ 371 (c)(1),
(2) Date: Jun. 2, 2021

(87) PCT Pub. No.: WO2020/234562
PCT Pub. Date: Nov. 26, 2020

(65) Prior Publication Data
US 2021/0353385 A1 Nov. 18, 2021

(30) Foreign Application Priority Data
May 23, 2019 (GB) ...................................... 1907268

(51) Int. Cl.
*A61C 5/00* (2017.01)
*A61C 5/80* (2017.01)
(Continued)

(52) U.S. Cl.
CPC ................ *A61C 5/007* (2013.01); *A61C 5/77* (2017.02); *A61C 5/80* (2017.02); *A61C 13/0019* (2013.01); *A61C 19/063* (2013.01)

(58) Field of Classification Search
CPC .. A61C 5/007; A61C 5/80; A61C 5/77; A61C 5/20; A61C 5/30; A61C 13/0019;
(Continued)

(56) References Cited

U.S. PATENT DOCUMENTS 5,000,687 A 3/1991 Yarovesky et al.
5,658,963 A 8/1997 Qian et al.
(Continued)

FOREIGN PATENT DOCUMENTS

EP 1 457 167 9/2004
WO WO 01/10335 2/2001
(Continued)

OTHER PUBLICATIONS

Great Britain Combined Search and Examination Report dated Nov. 21, 2019 issued in Great Britain Patent Application No. GB1907268.5, 7 pp.
(Continued)

*Primary Examiner* — Heidi M Eide
*Assistant Examiner* — Drew S Folgmann
(74) *Attorney, Agent, or Firm* — Nixon & Vanderhye P.C.

(57) ABSTRACT

A dental stent for tooth restoration, includes an acrylic outer shell and a set of metal matrix separator strips partially embedded into an inner silicon bed. A method of manufacturing a dental stent includes 3D printing of a model wherein tooth forms of teeth to be restored are individually removable from a remainder of the model. A method of tooth restoration uses a dental stent, and a kit of parts including a dental stent and a composite resin, and optionally a heater, a light cure unit, and a finishing tool kit.

16 Claims, 6 Drawing Sheets

(51) Int. Cl.
*A61C 5/77* (2017.01)
*A61C 13/00* (2006.01)
*A61C 19/06* (2006.01)

(58) Field of Classification Search
CPC .. A61C 13/0003; A61C 13/082; A61C 19/063
See application file for complete search history.

(56) References Cited

U.S. PATENT DOCUMENTS

| | | |
|---|---|---|
| 8,696,356 B2 | 4/2014 | Hegyi et al. |
| 9,375,290 B2 | 6/2016 | Csapo et al. |
| 2006/0115792 A1 | 6/2006 | Vuillemot |
| 2013/0130202 A1 | 5/2013 | Vuillemot |

FOREIGN PATENT DOCUMENTS

| | | |
|---|---|---|
| WO | WO 2011/156806 A1 | 12/2011 |
| WO | WO 2011/156806 A4 | 12/2011 |

OTHER PUBLICATIONS

International Search Report and Written Opinion dated Jun. 18, 2020 issued in PCT International Application No. PCT/GB2020/051096, 15 pp.

Brenes, Christian et al., "Digital Approach to the Fabrication of a Wax Prototype for Full-Mouth Rehabilitation of a Worn Dentition: A Clinical Report," Journal of Oral Science & Rehabilitation, vol. 3, Issue 4, Dec. 2017, pp. 42-47.

https://www.southerncrossdental.com.au/products/penn-composite-stent-, website pages, 3 pages, printed out on Feb. 9, 2022 (origination date unknown).

Image from www.Densignlab.co.uk/virtual-diagnostic-wax-up/, Virtual Diagnostic Wax Up, Jul. 23, 2015, 1 page.

Image from YouTube Video, Southern Cross Dental, The Penn Composite Stent, May 9, 2012, 1 page.

Image from Researchgate.net, Aug. 2018, 1 page.

DENTAL STENT

This application is the U.S. national phase of International Application No. PCT/GB2020/051096 filed May 4, 2020 which designated the U.S. and claims priority to Great Britain Patent Application No. 1907268.5 filed May 23, 2019, the entire contents of each of which are hereby incorporated by reference.

FIELD OF THE INVENTION

The present invention relates to dental treatments. Certain embodiments of the present invention relate to methods and apparatus for tooth restoration.

BACKGROUND TO THE INVENTION

The appearance of tooth deficiencies or imperfections can be improved by restorative dental work.

One known technique for restoring the appearance of teeth is the application of porcelain veneers. This procedure is expensive, time consuming, and often requires significant removal of tooth enamel before the veneers are fitted.

Another known dental restoration technique is composite resin bonding, wherein teeth shapes and size and form can be reshaped, lengthened, widened and altered by addition of a composite resin. This technique is currently undertaken, on a freehand basis, by many professionals, as it is highly desired by patients and is relatively affordable as a solution. Being freehand, there is a lot of artistic license, and as such the results are not consistent. The process is extremely time-consuming, and for a less-trained dentist is a highly pressurised process. It is extremely difficult to undertake accurately, and the aesthetic end results often look sub-optimal. The other significant issue is the creation on overhangs or ledges between teeth which are difficult for the patient to keep clean and cause dental gum problems and teeth cavities in over time. Subsequent smoothing and polishing is then required to remedy this, however it is often not completely achieved.

It is an aim of certain embodiments of the present invention to at least partly mitigate the above-mentioned problems.

It is an aim of certain embodiments of the present invention to provide an apparatus, and a method, which improve the ease and accuracy with which a composite resin can be applied to a patient's teeth, whilst ensuring optimal aesthetic end results, such as the definition of individual teeth.

Certain embodiments of the present invention relate to a dental stent. A "dental stent" is to be understood to as an apparatus comprising a generally hollow internal cavity which allows the stent to be placed over a patient's upper or lower set of teeth.

The dental stent of the present invention is used to accurately carry information of a new shape and anatomical detail from a predesigned digital or traditional model of the ideal, "perfect teeth" form, directly into the mouth and transfer these shapes onto the patient's teeth with minimal variation and minimal clean up.

SUMMARY OF CERTAIN EMBODIMENTS OF THE INVENTION

In a first aspect, the present invention comprises dental stent comprising a stent base and a set of separators; wherein the stent base comprises an outer shell, and an inner bed comprising a contoured cavity corresponding to a patient-specific dental model and comprising a plurality of tooth cavities; and wherein the set of separators comprises a plurality of separator strips each of which are partially embedded into the inner bed.

The stent base may be formed of clear or transparent materials. The outer shell may be formed of a clear acrylic. The inner bed may be formed of a clear silicone. The separating strips are formed of a metal matrix strip.

In a further aspect the present invention comprises a kit of parts for tooth restoration comprising a dental stent as claimed in any one of the preceding claims, and a composite resin material.

The kit may further comprise a heater for heating the composite resin and the dental stent.

The kit may further comprise a light cure unit.

The kit may further comprise a finishing set of tools comprising burs and polishing tools.

In a further aspect the present invention comprises a method of manufacturing a dental stent as described above, the method comprising steps of:
  (a) creating an initial model of a patient's teeth;
  (b) digitally scanning the initial model to create a digital model;
  (c) digitally re-designing at least some of tooth forms in the digital model, and digitally sectioning all re-designed tooth forms from a remainder of the digital model, thereby to create a modified digital model;
  (d) 3D printing a modified model from the modified digital model, in which re-designed tooth forms are each individually removable from a corresponding socket provided in a base of the modified model;
  (e) forming a template over the modified model;
  (f) forming the outer shell of the stent over the template;
  (g) removing the outer shell and the template from the modified model, and removing the template from the outer shell;
  (h) forming the set of separator strips;
  (i) inserting a separator strip between each pair of adjacent teeth forms of the modified model;
  (j) filling the outer shell with an inner bed material;
  (k) placing the outer shell over the model such that the teeth forms and the separator strips are caused to be inserted into the inner bed material;
  (l) allowing the inner bed material to set;
  (m) removing the dental stent from the modified model.

The method may further comprise, before forming a template over the modified model, removing redesigned tooth forms, placing a wax-skim over the redesigned tooth forms, recontouring and texturing the redesigned tooth forms, and replacing the each redesigned tooth form back into its corresponding socket in the base of the modified model.

The template may comprise either a lab putty, or a 3D printed shell.

Forming the outer shell of the stent over the template may comprise vacuum-forming an acrylic sheet over the template.

The inner bed material may be a silicone, and the method may further comprise, before step (k), coating tooth forms of the modified model with the silicone.

The method may further comprise, after removing the dental stent from the modified model, drilling evacuation vents into the stent, through the outer shell and the inner bed.

The relief holes may be drilled into a most incisal part of each tooth cavity.

The method may further comprise, after step (h), forming at least one hole in each separator strip, close to a corner of the separator strip, and wherein, during step (k), inner bed material is caused to flow into the holes.

The method may further comprise, after step (l), placing the dental stent in a pressure vacuum.

In a further aspect the present invention comprises a method of tooth restoration using a dental stent; the dental stent comprising a stent base and a set of separators; wherein the stent base comprises an outer shell, and an inner bed comprising a contoured cavity corresponding to a patient-specific dental model; and wherein the set of separators comprises a plurality of separator strips each of which are partially embedded into the inner bed;

wherein the method comprises steps of:
(a) inserting a heated composite resin into the stent;
(b) placing the stent over a patient's teeth such that the patient's teeth are inserted into composite resin and the separator strips locate between adjacent teeth to be treated; and
(c) curing the composite resin;
(d) removing the stent from the patient's teeth.

The dental stent may further comprise evacuation vents such that during step (b), excess composite resin is forced through the evacuation vents to an exterior of the dental stent.

The stent may be formed of clear or transparent materials, and curing the composite resin may comprise curing with a light-cure unit.

The method may further comprise, after step (d), sealing treated teeth with an oxygen-inhibiting gel, and curing through the oxygen-inhibiting gel with a light-cure unit.

The method may further comprise a subsequent finishing stage comprising removing excess composite resin from around the treated teeth. The method may comprise a further subsequent stage of adding surface texture to the treated teeth.

DETAILED DESCRIPTION OF EMBODIMENTS OF THE INVENTION

Embodiments of the present invention will now be described hereinafter, by way of example only, with reference to the accompanying drawings in which.

In the drawings like reference numerals refer to like parts.

In accordance with embodiments of the present invention, a patient-specific stent 100 is provided. The stent 100 is patient-specific as it corresponds to either an upper or lower set of teeth of a specific patient.

Figure 6:
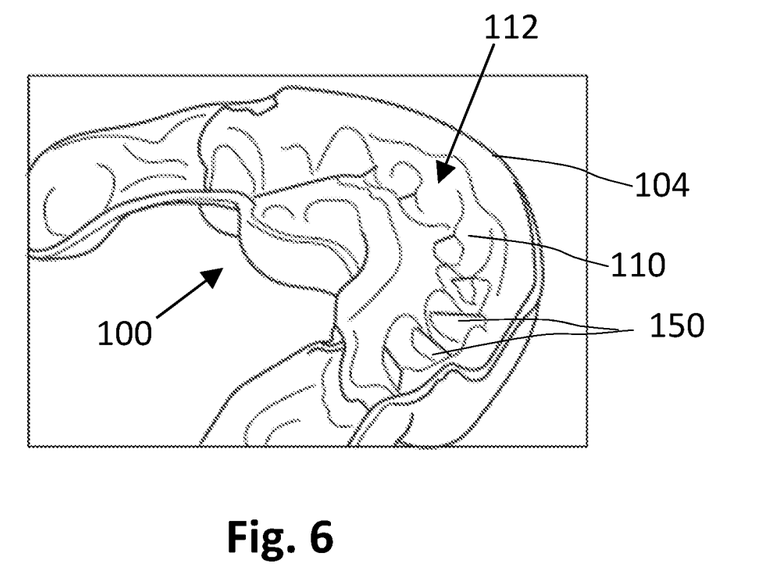
Figure 10:
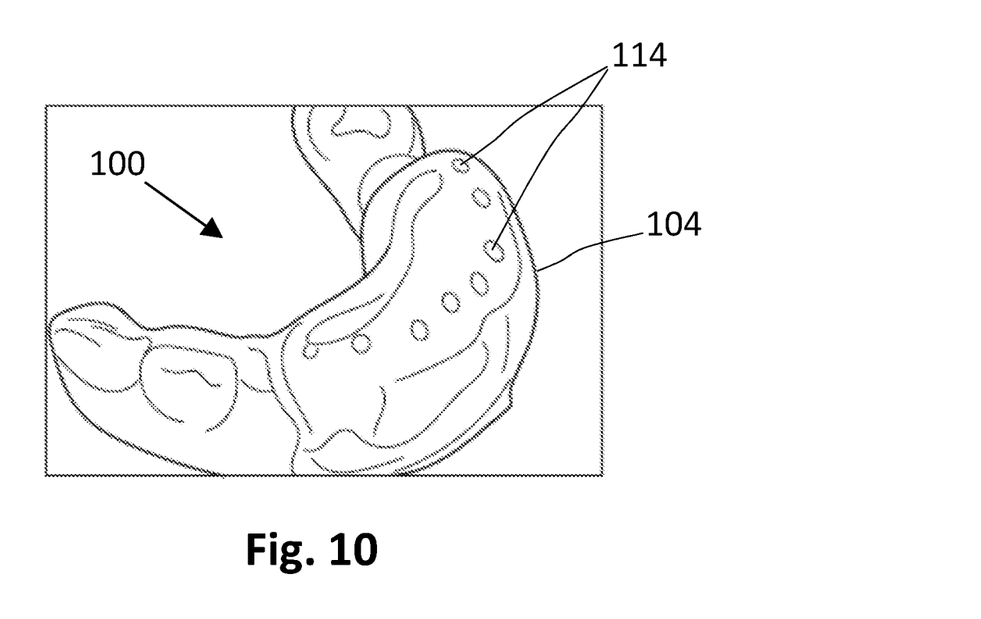

A partially-formed stent 100 is illustrated in FIG. 6, and a fully-formed stent 100 is illustrated in FIG. 10. Referring to FIGS. 6 and 10, the stent 100 comprises a stent base, and a set of separators 150.

The stent base comprises an outer shell or tray 104, formed of a hard material, and an inner bed 110. The outer shell/tray 104 and inner bed 110 are preferably formed of a transparent or clear material.

An example material for the outer shell 104 is a clear acrylic, such as Zendura® 1 mm clear acrylic sheets or Essix® PLUS™ Plastic 1 mm sheets.

An example material for the inner bed 110 is a clear silicone, such as GC® EXACLEAR Clear vinyl polysiloxane or Kulzer Memosil® 2 transparent A-silicone.

The set of separators 150 comprises a plurality of individual separators 150a, 150b, 150c, 150d. etc. The separators 150a-150d are formed of a thin material, for example a metal matrix strip, such as Directa Straight Matrix Strips or UnoDent Siqveland Wide Matrix Bands.

The separators 150a-150d are each partially embedded in the inner bed 110, and partly not embedded in the inner bed 110.

The inner bed 110 comprises an interior contoured cavity 112 which has been shaped to conform to a model of either an upper or a lower set of a patient's teeth, as outlined below. The interior contoured cavity 112 therefore comprises a plurality of tooth cavities.

Manufacture of a Stent

Example steps for manufacturing a patient-specific stent 100 are outlined below, with reference to FIGS. 1 to 10.

An initial model of a patient's upper or lower set of teeth is obtained, using any suitable known technique.

The initial model provides a 3D representation of natural teeth, including all imperfections, damage, etc.

The initial model is then digitally scanned. Using digital design software, the shape of any tooth then can be redesigned, i.e. a required, or 'ideal' tooth shape and form is designed in respect of each tooth of a patient which is to be restored. A modified digital model is thereby created.

Some, or all, of the teeth in the initial model could be digitally redesigned into an ideal shape and form. If some, but not all of the teeth forms, are to be digitally redesigned, the remaining teeth forms are left corresponding to their original/natural form and shape in the modified digital model.

In an example embodiment, only the front six teeth of a patient are to be restored. In this example, the front six teeth are redesigned, i.e. enhanced, in the digital model, to be of the 'ideal' shape and form. Teeth other than the front six teeth, i.e. those which are not being restored, are left as in their original, natural form in the modified digital model.

In the modified digital model, the teeth to be restored are then digitally sectioned from the remainder of the model. The modified digital model then comprises a base, wherein any teeth forms corresponding to teeth which are not to be restored, are integral to the base, and any teeth forms corresponding to teeth which are to be restored, are digitally separated from the base.

After digital enhancement, and sectioning, of the relevant tooth forms, thereby to create the modified digital model, a physical modified model 200 is created, based on the modified digital model, by 3D printing.

As a result of the sectioning of the tooth forms corresponding to teeth to be restored, the modified model 200 when printed comprises a base, formed integrally with any or all tooth forms 202 corresponding to teeth which are not be restored, and separate, individual tooth forms 202 corresponding to teeth to be restored, each of which are individually removable from the base.

In the example provided above, the modified model 200 when printed would comprise six individual tooth forms 202 corresponding to teeth to be restored, and a base, formed integrally with all other teeth which are not to be restored. The six teeth forms 202 corresponding to teeth to be restored would fit into and be removable from corresponding sockets formed in the base 200.

The digital sectioning and/or digital printing process may result in a slight change in tooth shape and size of the individual tooth forms 202. To remedy this, an optional further step may be undertaken, wherein a thin layer of wax resin is placed over the individual tooth forms 202. Once the wax has set, the surfaces of the individual tooth forms 202 can be re-contoured and textured by hand as required, and then returned to the master modified model.

The next stage of manufacture comprises the creation of a template, i.e. a base form/shape, upon which the outer shell 104 will be formed. As described below, this stage can be undertaken in an analogue manner, in which a lab putty 204 is used to form the template, or in a digital manner, in which the template is digitally created.

Analogue
- A lab putty 204 is mixed, and placed over the modified model 200, from first premolar to first premolar.
- The putty 204 is trimmed with a scalpel, to create a spacer approximately 5 mm around all the teeth forms 202. Incisally, the putty 204 should ideally no more than 3-5 mm.
- The putty 204 is trimmed so that only one half of the tooth distal to the canine is covered in the putty 204.
- A securing indentation is then placed along the buccal surface of the putty 204 with a round bur.
- The lab putty 204 thereby forms a template.

Digital
- Utilising computer-aided-design software, a spacer of 5 mm is placed over the teeth from the first premolar to first premolar.
- A 3D-printed shell is then made to follow the form of this space created.
- A securing indentation is then placed along the buccal surface of the shell with a round bur.
- The printed shell is secured over the individual teeth forms 202 of the modified model 200 with a small increment of a sticky material such as Blu-Tack.
- The 3D-printed shell thereby forms a template.

After a template has been formed in an analogue or a digital manner as above, an acrylic sheet, such as a 1 mm clear Zendura® acrylic sheet, is then vacuum-formed over the template, i.e. over the putty 204 or the 3D-printed shell, thereby to form the outer shell/acrylic tray 104.

Figure 1:
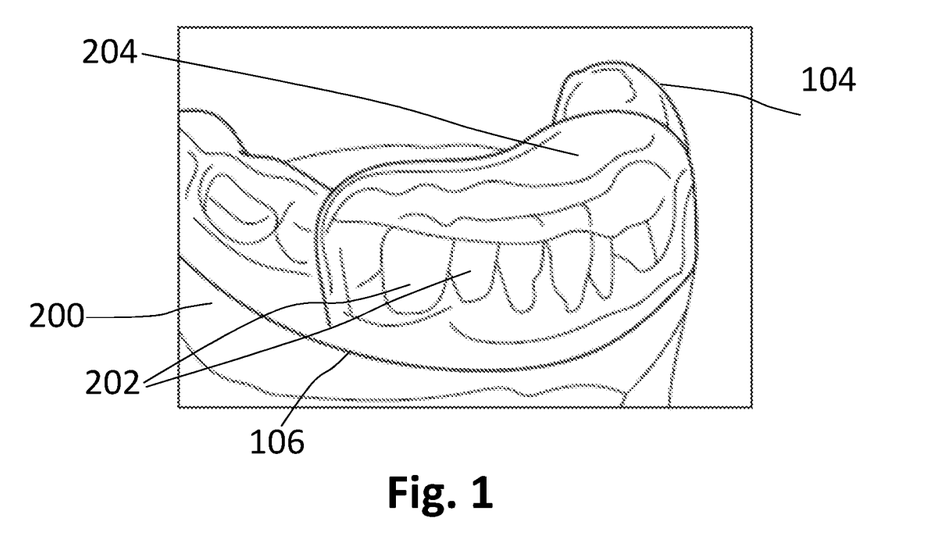
FIGS. 1 to 10 illustrate various steps of the manufacture of a patient-specific stent according to certain embodiments of the present invention.
Figure 2:
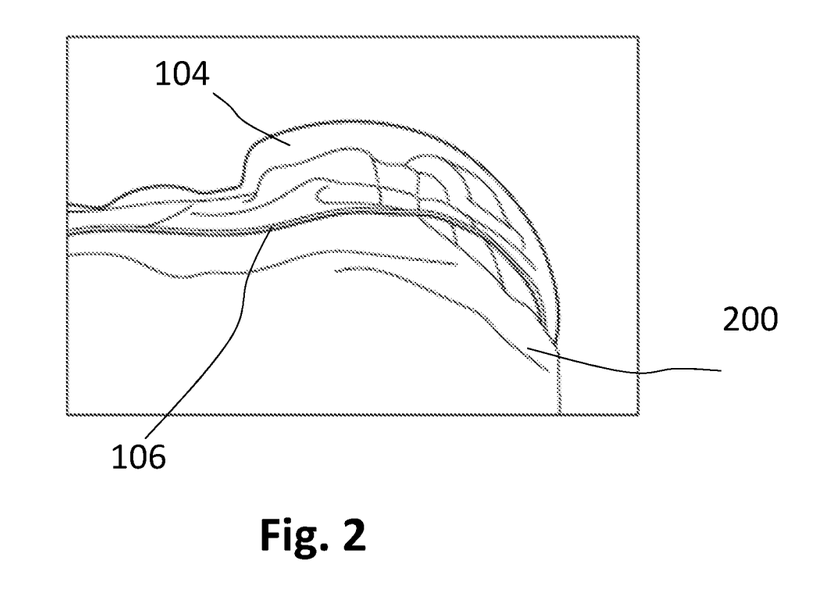
Figure 3:
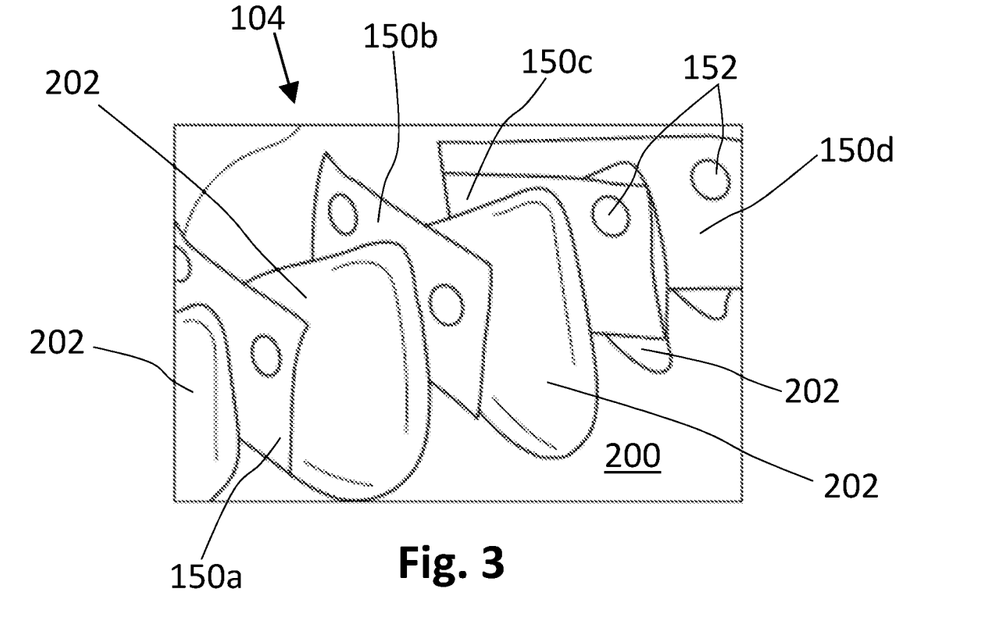
Figure 4:
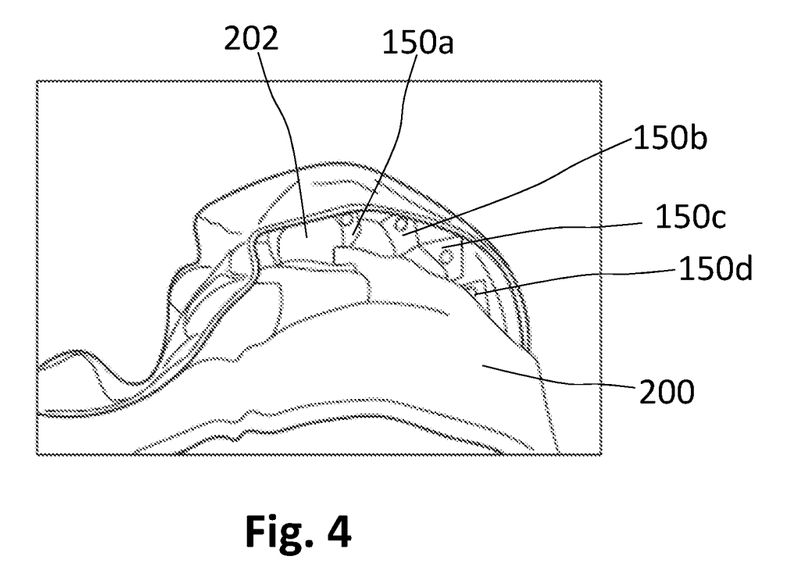

FIG. 1 illustrates the acrylic tray 104 after it has been vacuum formed over a template.

The acrylic tray 104 is then trimmed, at edge 106 (FIG. 2), to approximately 3-5 mm below the gum level for all teeth forms 202, finishing at the distal end of the tray 104 on at least three posterior molar/pre-molar teeth.

After the acrylic tray 104 has been vacuum formed over the template, the acrylic tray 104 and the template are removed from the modified model 200, and the template is removed from inside the tray 104 and disposed of. Once the template has been removed from the acrylic tray 104, the tray 104 now comprises an empty, clear shell.

The separators 150a-150d, for slotting between two individual teeth forms 202, are formed by cutting a thin strip, such as a metal matrix strip, into rectangular forms.

Holes 152 are then punched into each of the rectangular forms, as close to the corners as possible, for example two holes 152 are formed in opposing corners along a long side of the rectangular form.

Figure 5:
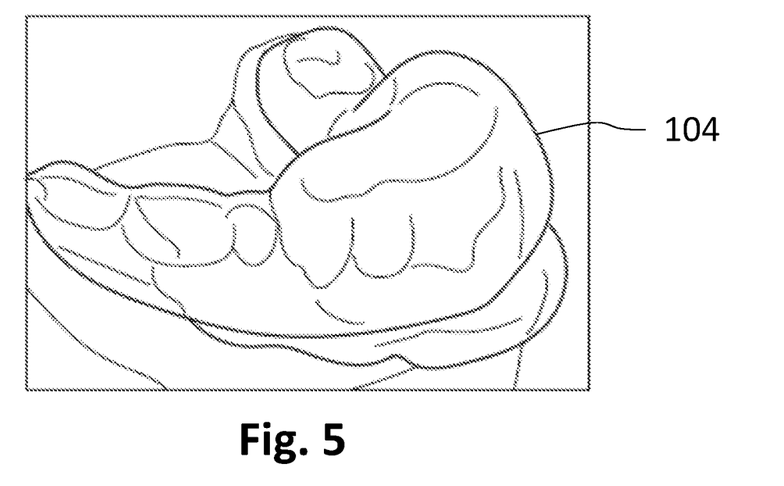

The separator strips 150a-150d are then inserted between each pair of adjacent teeth forms 202 of the modified model 200, corresponding to patient's teeth which are to be treated. This step is illustrated in FIG. 5. It is ensured that each separator 150a-150d is acting to separate two adjacent teeth forms 202 along the entire length of the contact point of the teeth forms 202.

The separator strips 150a-150d are each of a sufficient size, and a suitable shape, such that a strip can be placed between two teeth, whilst ensuring that each side of the strip will extend beyond the teeth so as to be embedded into a silicone 110, as described below. For example, each separator strip could be 10 mm by 15 mm. The separator strips 150a-d each can be placed horizontally, or, if necessary to ensure separation of a long contact point, vertically.

The teeth forms 202 of the modified model 200 are then covered with a thin film of clear silicone 110, such as GC® EXACLEAR, ensuring that air bubbles are not introduced.

The acrylic tray 104 is then filled with the same clear silicone 110 as has been applied to the modified model teeth forms 202.

The acrylic tray 104 is then placed down onto the modified model 200, until the tray 104 is fully seated onto the posterior teeth forms, i.e. the tray 104 is placed over the modified model 200 such that the teeth forms 202 of the modified model 200, and the separator strips 150a-150d, are caused to be inserted into the silicone within the tray 104.

During the seating of the tray 104, silicone 110 is caused to flow into and through the holes 152 provided in the separators 150a-150d.

The acrylic tray 104 is left on the modified model 200 for a sufficient amount of time to allow the silicone 110 to set, for example five minutes.

Once the silicone 110 has set in the acrylic tray 104, the portions of the separator strips 150a-150d are maintained embedded into the silicone 110. The setting of the silicone 110 within the holes 152 provided in the separators 150a-150d enhances the embedding of the separators 150a-150d.

The apparatus may be placed in a pressure vacuum to force out and remove any air bubbles from the clear silicone and cause a perfect close fit to the underlying teeth forms 202.

Figure 7:
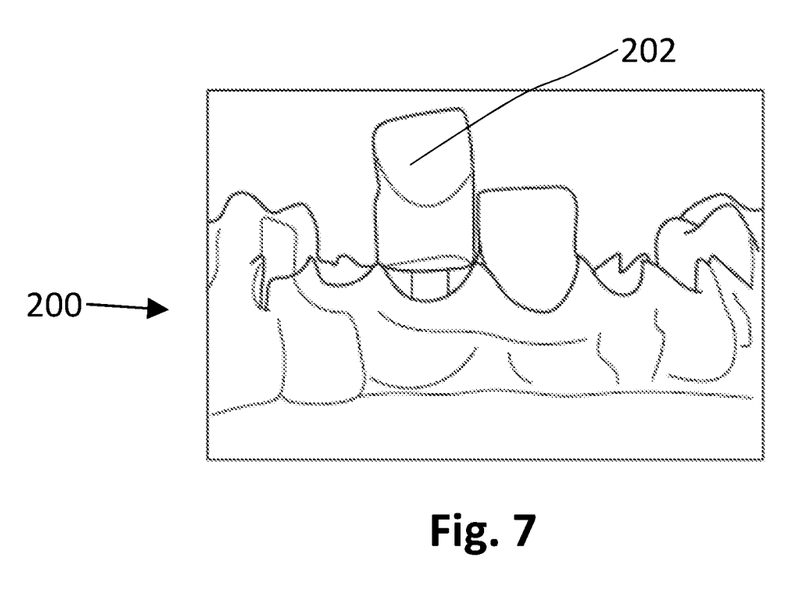
Figure 8:
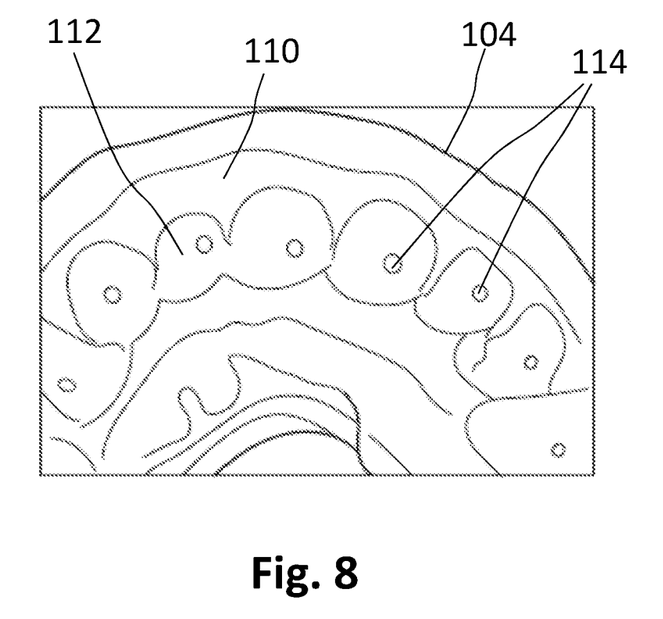
Figure 9:
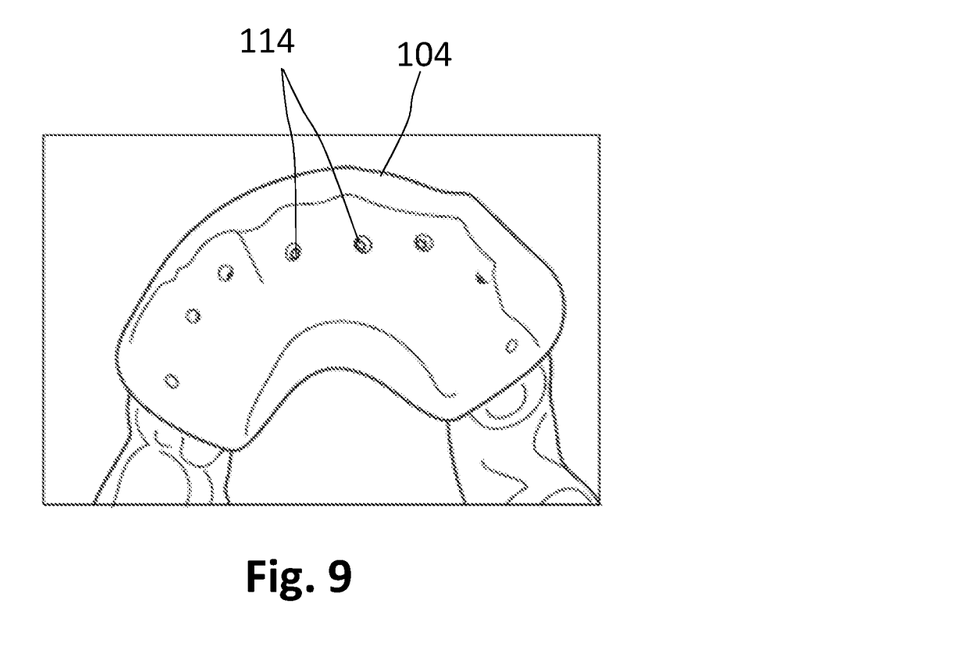

After the silicone 110 has set, the stent 100, formed of the acrylic tray 104 and the set silicone 110, is removed from the model 200 (FIG. 6 illustrates the stent 100 after it has been removed from the model 200). If necessary to aid in removal of the stent 100 from the model 200, it is possible to push individual tooth forms 202 out of their corresponding sockets from the underside of the modified model 200 (FIG. 7).

The separators 150a-150d are maintained in place, embedded in the silicone 110, once the silicone 110 has set. The fixing/embedding of the separators 150a-150d in the silicone 110 is improved by the silicone 110 which has flowed through the separator holes 152 and set.

The resulting stent 100 is patient-specific, as the interior contoured cavity 112 provided in the silicone bed 110 corresponds to the modified model 200 of the patient's teeth, i.e. the interior cavity 112 comprises a plurality of individual tooth form cavities, with the separators 150a-150d being located at positions corresponding to gaps between the patient's teeth.

Relief holes/evacuation vents 114, for example of 2 mm, are then drilled through the stent 100, i.e. the holes 114 are drilled through the outer shell/tray 104 and through the silicone bed 110, and into the most incisal part of each tooth form cavity, canine to canine. Any debris is removed from the stent 100, and it is ensured that the relief holes 114 are clear.

Any excess silicone is the removed from the borders of the stent 100, and the margins of the stent 100 are checked to ensure that there are no sharp edges.

The completed patient-specific stent 100 is then disinfected, for example with a Dental Impression Disinfection spray, and rinsed. The patient-specific stent 100 is then packaged and labelled with the patient's identity.

It will be appreciated that other fabrication methods may be suitable to produce the apparatus as described herein.

Treatment

A patient-specific stent 100 according to the present invention is used in the application of a composite resin to a patient's teeth. A kit of parts for a tooth restoration procedure comprises the patient-specific stent 100, and a composite resin. The kit of parts could also comprise one or more of a heater for heating the stent 100 and the composite resin, a light cure unit, and a finishing tool set including burs and polishing wheels.

The treatment procedure comprises the following subsections:
1. Initial preparation
2. Test-fitting of the stent
3. Preparation of the teeth
4. Restoration of the teeth
5. Finishing the teeth
6. Adding surface texture Initial Preparation Composite resin, of a selected colour and in a sufficient quantity, is placed in (or on) a composite heater. Examples of suitable composite resins are; Tetric EvoCeram® by Ivoclar Vivadent, Venus® Pearl by Kulzer, and Filtek™ Supreme XTE by 3M. The stent 100 is also placed onto the heater.

A local anaesthetic is provided to the patient at the area to be treated, and the patient's lips are retracted with a suitable lip retractor device. The patient's facial ginigival margins are retracted by placing tape, such as PTFE tape, into the gingival sulcus. Ideally, a single piece of tape can be used and packed in using cord packers, from canine tooth to canine tooth on either side of the patient's mouth.

An ultra-fine metal finishing strip is used to clean the contacts from the mesial of one canine tooth to the mesial of the contralateral canine tooth.

The teeth are cleaned with a pumice, to remove any visible stains and plaque, and then rinsed and dried.

Test-Fitting of the Stent

The patient-specific stent 100 is then test-fitted in the patient's mouth. The stent 100 is carefully positioned over the patient's teeth, whilst ensuring, for example by making minor movements and adjustments, that the individual separators slide down between individual teeth.

The seating of the stent 100, on the close-fitting posterior part of the acrylic tray 104, is then checked. The silicone 110 around the front teeth is also checked to ensure that it is seated fully onto the gums.

The stent 100 is then removed from the patient's teeth, and the interior contoured cavity 112 of the stent 100 is checked, for example for any bend or tears in the separators 150a-150d, any debris, or saliva contamination. The stent 100 is then rinsed and thoroughly dried if necessary.

The selected heated resin is then inserted into the stent 100. The loading of the composite resin into the stent 100 should be started at the incisal edge, and the composite resin is loaded until it fills each compartment of the stent 100 up to and along the facial surface to the gum margin.

The stent 100, loaded with composite resin, is then loaded onto the heater and covered with a light-protective cover.

Preparing the Teeth

To prepare a patient's teeth for restorative treatment stage, the incisal edges of the teeth to be treated are bevelled, and the interproximal incisal edges are bevelled in the direction of the contacts. Any old restorative remaining on the patient's teeth is removed.

A section of the metal matrix strip is placed at the distal of both canine teeth to protect the surfaces of the neighbouring teeth from the following cleaning and etching sequence. The teeth to be restored are sandblasted thoroughly, for example with a 50 micron aluminium oxide power, and then rinsed. An alternative would be to clean the teeth with a dental pumice to remove any plaque biofilm.

A 35% orthophosphoric acid etch is then placed on all the surfaces of the teeth to be restored, facial and palatal, left for 45 seconds, and then thoroughly rinsed and thoroughly dried.

PTFE tape is then placed between and over the teeth distal to the planned last tooth to be restored.

A bonding agent is then applied, according to manufacturer instructions.

Restoring the Teeth

An optional dentine layer can be applied to the teeth at this stage.

The patient-specific stent 100 is retrieved from the heater, and is placed into the patient's mouth and over the relevant set of the patient's teeth. As in the test-fit, the stent is carefully seated whilst ensuring, by making minor movements and adjustments, that the individual separators 150a-150d correctly locate between the individual teeth.

After the stent 100 has been placed over the patient's teeth, it is agitated from side to side to ensure correct seating, whilst maintaining a firm seating pressure.

Excess composite resin, which will have been forced through the evacuation vents/holes 114, is then wiped away from the exterior of the stent 100.

Whilst the firm seating pressure is maintained, the composite resin is cured, through the clear or transparent material of the stent 110, with a light-cure unit, such as a high intensity blue light-cure unit. Every tooth being treated is cured for at least one minute.

The stent 100 is then removed from the patient's mouth. Any separators 150a-150d which remain between the patient's teeth are also removed.

The treated area is then sealed with an oxygen-inhibiting gel, which is then cured through with the light-cure unit.

Finishing the Teeth

The restorative treatment is finished by removal of composite flash, i.e. excess composite resin, from around the treated teeth. Example steps for finishing the teeth are provided below. The burs and polishing tools as referred to below are indicated in the tool kit illustrated in FIG. 11.

Figure 11:
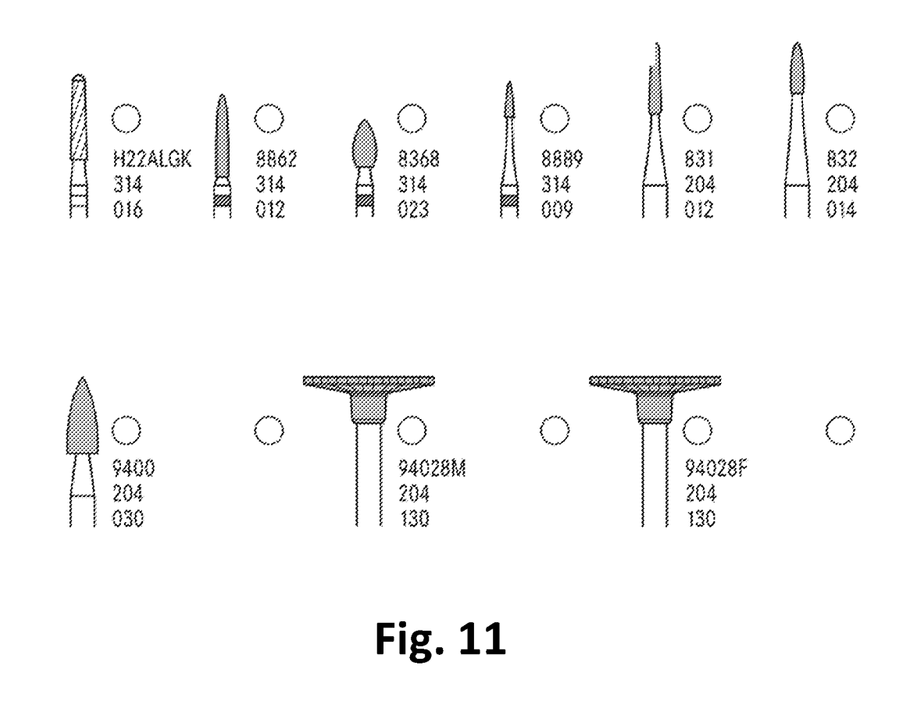
FIG. 11 illustrates a tool kit for use with the present invention.

A suitable bur, such as 8862, is used to trace around the cervical contours of the teeth, following the gum margin, until the PTFE tape in the sulcus is reached. Composite flash at the gum level is then removed.

A suitable bur, such as 8368, is then used to remove any composite flash which has extended palatally.

A suitable bur, such as 8889, is then used interproximally to remove any composite flash between the teeth at the gum level both facially and palatally.

A coarse sof-lex disc is then used to gently remove any excess composite at the evacuation vent sites.

A suitable bur, such as 831, is then used over the surfaces of the teeth to remove any irregularities.

A suitable bur, such as 9400, is then used around the gum margins, to smooth the transition of the composite from tooth to gum. Any ledges are removed and contoured with a suitable bur such as 8862 or 8889.

Occlusion and articulation are then checked, and a suitable bur such as 8368 is used to adjust as necessary.

Once all margins are smooth (a periodontal probe can be used to asses for ledges) both facially, interproximally and palatally, then next stage, of surface texturization can be undertaken.

Adding Surface Texture

A vertical macro anatomy is marked on each tooth in pencil. Suitable burs, such as 831 and 832, are used to apply these contours. The contours are softened with a bur such as the 9400.

The horizontal macro- and micro-texture is then defined, for example with an 831/832 bur.

Each treated tooth is then polished, for example with a 94028M polishing wheel (facial and palatal). A high shine is provided to selected areas of the tooth with, for example, a 94028F polishing wheel.

Occlusion and all excursions are then checked with the patient sitting upright, and further adjustments are made if necessary.

The PTFE tape is then removed, and the margins are rechecked.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of manufacturing a dental stent, the method comprising steps of:
    (a) creating an initial model of a patient's teeth;
    (b) digitally scanning the initial model to create a digital model;
    (c) digitally re-designing at least some of tooth forms in the digital model, and digitally sectioning all re-designed tooth forms from a remainder of the digital model, thereby to create a modified digital model;
    (d) 3D printing a modified model from the modified digital model, in which re-designed tooth forms are each individually removable from a corresponding socket provided in a base of the modified model;
    (e) forming a template over the modified model;
    (f) forming an outer shell of the dental stent over the template;
    (g) removing the outer shell and the template from the modified model, and removing the template from the outer shell;
    (h) forming a set of separator strips;
    (i) inserting a separator strip from the set of separator strips between each pair of adjacent teeth forms of the modified model;
    (j) filling the outer shell with an inner bed material;
    (k) placing the outer shell over the model such that the teeth forms and the separator strips are caused to be inserted into the inner bed material;
    (l) allowing the inner bed material to set;
    (m) removing the dental stent from the modified model; wherein after manufacture, the dental stent comprises:
        the outer shell;
        an inner bed formed of the inner bed material and comprising a contoured cavity corresponding to the modified model; and
        the set of separator strips, each of which are partially embedded into the inner bed.

2. A method as claimed in claim 1 further comprising, before forming a template over the modified model, removing redesigned tooth forms, placing a wax-skim over the redesigned tooth forms, recontouring and texturing the redesigned tooth forms, and replacing the each redesigned tooth form back into its corresponding socket in the base of the modified model.

3. A method as claimed in claim 1 wherein the template comprises either a lab putty, or a 3D printed shell.

4. A method as claimed in claim 1 wherein forming the outer shell of the stent over the template comprises vacuum-forming an acrylic sheet over the template.

5. A method as claimed in claim 1 wherein the inner bed material is a silicone.

6. A method as claimed in claim 5 further comprising, before step (k), coating tooth forms of the modified model with the silicone.

7. A method as claimed in claim 1 further comprising, after removing the dental stent from the modified model, drilling evacuation vents into the stent, through the outer shell and the inner bed.

8. A method as claimed in claim 7 wherein the relief holes are drilled into a most incisal part of each tooth cavity.

9. A method as claimed in claim 1 further comprising, after step (h), forming at least one hole in each separator strip, close to a corner of the separator strip, and wherein, during step (k), inner bed material is caused to flow into the holes.

10. A method as claimed in claim 1 further comprising, after step (1), placing the dental stent in a pressure vacuum.

11. A method of application of a composite resin to a patient's teeth using the dental stent manufactured according to the method of claim 1;
    wherein the method comprises steps of:
    (a) inserting a heated composite resin into the stent;
    (b) placing the stent over the patient's pre-prepared teeth such that the patient's teeth are inserted into composite resin and the separator strips locate between adjacent teeth to be treated;
    (c) curing the composite resin; and
    (d) removing the stent from the patient's teeth.

12. A method as claimed in claim 11 wherein the dental stent further comprises evacuation vents, and wherein, during step (b) excess composite resin is forced through the evacuation vents to an exterior of the dental stent.

13. A method as claimed in claim 11, wherein the stent is formed of clear or transparent materials, and wherein curing the composite resin comprises curing with a light-cure unit.

14. A method as claimed in claim 11 further comprising, after step (d), sealing treated teeth with an oxygen-inhibiting gel, and curing through the oxygen-inhibiting gel with a light-cure unit.

15. A method as claimed in claim 11 further comprising a subsequent finishing stage comprising removing excess composite resin from around the treated teeth.

16. A method as claimed in claim 15 further comprising a subsequent stage of adding surface texture to the treated teeth.

* * * * *